No. 865,171. PATENTED SEPT. 3, 1907.
C. A. DUNHAM.
THERMOSTATIC CONTROLLER.
APPLICATION FILED JUNE 9, 1905.
2 SHEETS—SHEET 1.
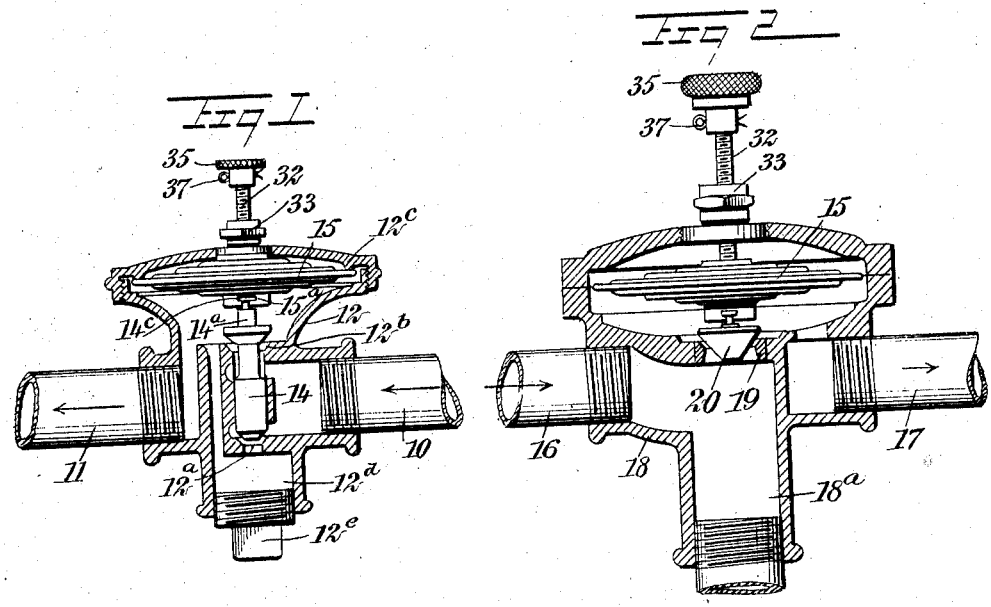
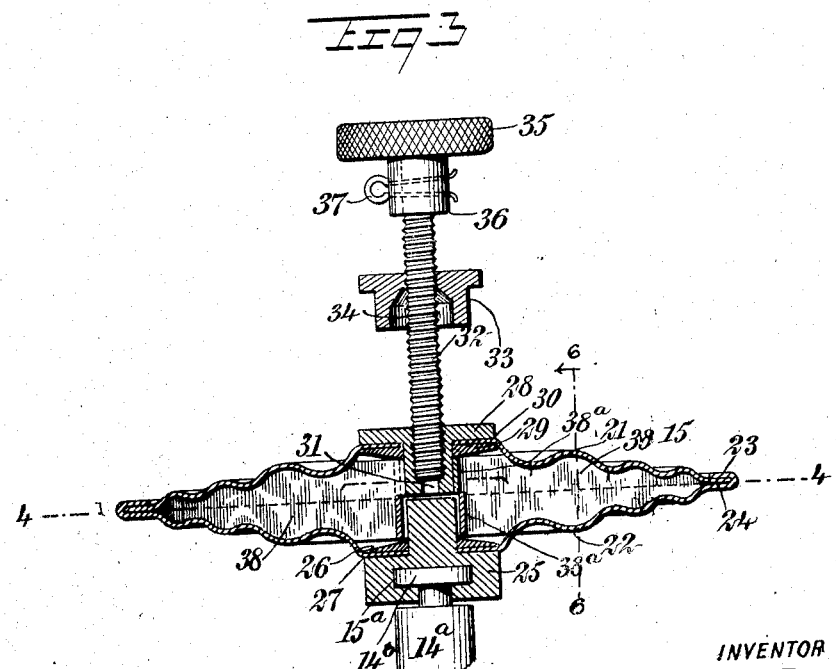

No. 865,171. PATENTED SEPT. 3, 1907.
C. A. DUNHAM.
THERMOSTATIC CONTROLLER.
APPLICATION FILED JUNE 9, 1905.

2 SHEETS—SHEET 2.

WITNESSES
William P. Goebel
C. W. Fairbank

INVENTOR
Clayton A. Dunham
BY Munn & Co
ATTORNEYS

UNITED STATES PATENT OFFICE.

CLAYTON AUBRA DUNHAM, OF MARSHALLTOWN, IOWA.

THERMOSTATIC CONTROLLER.

No. 865,171. Specification of Letters Patent. Patented Sept. 3, 1907.

Application filed June 9, 1905. Serial No. 264,535.

*To all whom it may concern:*

Be it known that I, CLAYTON AUBRA DUNHAM, a citizen of the United States, and a resident of Marshalltown, in the county of Marshall and State of Iowa, have invented a new and Improved Thermostatic Controller, of which the following is a full, clear, and exact description.

My present invention relates to an improvement in thermostatically operated controlling devices of the same general type as those disclosed in my prior patents numbers 735,733, August 11, 1903, and 753,557, March 1, 1904.

The invention is useful primarily as a steam trap, but it is also useful with controlling valves and other devices in various connections where it is desired to operate the valve or other device according to temperature changes.

The object of my present invention is principally to improve the construction and assemblage of the chambered expansion disk which is employed to actuate the valve or other member, rendering the expansion disk more sensitive and at the same time more durable and easier of operation than such disks previously constructed.

The invention involves various other changes of major or minor importance, all of which will be fully set forth hereinafter and particularly pointed out in the claims.

Figure 4:
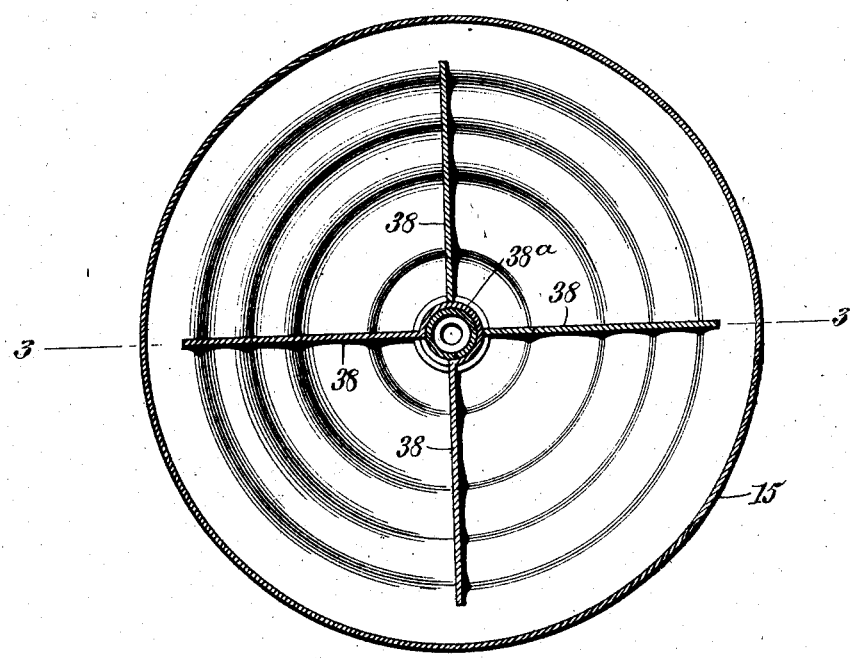
Figure 6:
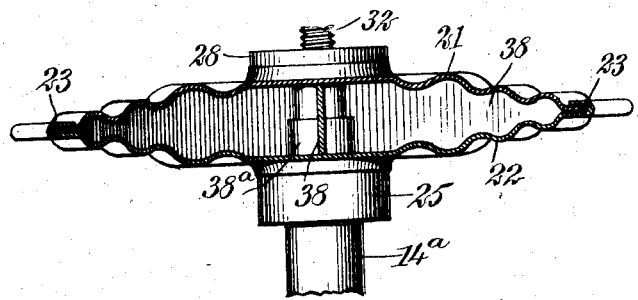
Figure 5:
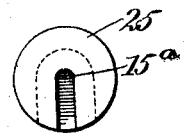

Reference is to be had to the accompanying drawings which illustrate as examples two embodiments of my invention, in which drawings like characters of reference indicate like parts in the several views, and in which Figure 1 is a sectional view of a steam trap fitted with my improved expansion disk; Fig. 2 is a sectional view of another form of trap fitted with said disk; Fig. 3 is an enlarged sectional view of the expansion disk and its connected parts, this view being taken essentially on the line 3—3 of Fig. 4; Fig. 4 is an enlarged section through the disk on the line 4—4 of Fig. 3; and Fig. 5 is a detail view showing the manner of connecting the stem of the valve to the disk, this device being useful, for example, in the connection shown in Figs. 1 and 2; Fig. 6 is a sectional view showing one of the radial braces in cross section, said view being taken on the line 6—6 of Fig. 3.

The expansion disk or member as here shown is round and this is the form which I deem preferable, but I desire it understood that I do not use the term "disk" herein as limiting me to a round or circular form.

Referring to Fig. 1, which shows my invention embodied in a steam trap, 10 indicates the inlet for the steam and water of condensation, and 11 the outlet for the water of condensation. These connections 10 and 11 communicate with a casing 12, which has a double valve-seat $12^a$, $12^b$ therein, with which operates a double valve 14 controlling the movement of the water of condensation through the trap. 15 indicates the expansion disk which is contained in a dome $12^c$ forming a part of the casing 12, and which is connected to the stem $14^a$ of the valve by means of a head $14^c$ on said stem, the head fitting in an under-cut slot $15^a$ forming a part on the under side of the expansion disk, as shown best in Fig 5. This allows the stem of the valve to be readily connected with and disconnected from the expansion disk, and at the same time it provides for the accurate transmission of the movement from the disk to the valve stem and consequently to the valve. $12^d$ indicates a nipple, which facilitates machine work and may, if desired, be used as a discharge. As here shown, it is fitted with a plug $12^e$.

As will be understood from the prior art, particularly my prior patents hereinbefore mentioned, the water of condensation accumulating in the connection 10 will be forced by the steam pressure through the normally open ports $12^a$ and $12^b$, the water passing out through the connection 11. When all the water is discharged and steam begins to pass the ports $12^a$ and $12^b$, this steam will act on the expansion disk, causing the same to expand, and this expansive movement closes the valve 14, thus preventing the escape of steam.

The form of trap shown in Fig. 2 involves inlet and outlet connections designated 16 and 17 respectively, which communicate with a casing 18 having a wall therein with a valve seat 19. Co-acting with the valve-seat is a valve 20, which controls fluid movement through the casing 18, and this valve is connected with the expansion disk 15 in the same manner as described in connection with the construction shown in Fig. 1. In this second form of trap the operation is essentially the same as that above described, the steam forcing the water of condensation past the normally open seat 19 and the steam arriving after the water expanding the disk 15 and causing the valve 20 to seat so as to prevent the escape of steam into the atmosphere, pump or into a hot well or other connection with which the connection 17 may communicate. $18^a$ indicates a trap for receiving scale, sediment or other foreign matter which may pass into the casing with the water of condensation and steam.

A special construction of the expansion disk 15 and its connected parts is illustrated best in Figs. 3 and 4. The disk is formed with two circular plates 21 and 22 which are preferably composed of high grade sheet phosphor bronze, but which may be composed of any other flexible or durable material. The outer edge of one of said plates, for example the plate 22, is turned up over the edge of the other plate, as indicated at 23, and the two plates are soldered together at their inner surface, as indicated at 24, and the lap 23 is also soldered to the plate 21, thus producing a double soldered joint. The plates 21 and 22 are preferably formed with concentric corrugations which increase their flexibility. The plate 22 has a central opening therein through which extends a plug 25, and it is in this plug that the before-described under-cut slot 15ᵃ is formed. This plug is soldered to the plate 22 inside, as indicated at 26, and is also soldered to the outer side of the plate, as indicated at 27, thus effecting a strong and hermetic connection. The plate 21 has a central opening which receives a plug 28, and this plug is soldered to the plate inside, as at 29, and outside as at 30, the same as the plug 25. The plugs 25 and 28 have their inner portions lying opposite each other and normally in close proximity, so as to resist any collapsing tendency on the part of the expansion disk. The plug 28 is formed with a central opening 31 to permit filling the expansion disk with a volatile substance, as will be hereinafter fully set forth. This opening is normally closed by a screw-pin 32 which operates in the internally threaded portion of the opening 31, and which normally is forced tightly into place. 33 indicates a combined stuffing box and lock-nut, which is threaded on the pin 32 and formed with a chamber 34 to receive a packing substance. By screwing this nut down on the casing of the trap, as shown in Figs. 1 and 2, not only is the packing compressed around the screw-rod so as to form a hermetic joint, but the element 33 binds against the casing forming a lock-nut, which prevents the accidental movement of the screw-pin in the casing. At its upper end the screw pin is provided with a knurled or milled thumb-wheel 35, which is formed with a sleeve 36 screwed on the pin 32, and held removably in place by a cotter 37. In order to assist the juxtaposed plugs 25 and 28 in the function of preventing the collapse of the expansion disk, particularly at the outer portions of the disks where the plugs are not effective, I provide spreader plates 38. These plates, as shown in Fig. 3, have a marginal form corresponding to the corrugations in the plates 21 and 22 and are fitted snugly within the expansion disk, so that upon any undue movement of the plates toward each other said plates will engage the spreaders or braces and their further movement will be arrested. The plates are disposed radially, as shown in Fig. 4. Preferably the four plates are formed integral in pairs, the members of each pair being connected by curved portions 38ᵃ which are reduced in width so as to permit said portions to cross each other. These curved portions 38ᵃ surround the inner portions of the plugs 25 and 28, as shown in Figs. 3 and 4. The expansion disk thus constructed is adapted to be filled, through the opening 31ᵃ with a volatile substance. Preferably this is a liquid substance, such as ammonia, and it is my purpose to partly fill the disk so that the vapor rising from the volatile fluid upon raising the temperature of the same will act interiorly on the disk, to expand it as contra-distinguished from filling the disk and expanding the same by a change in the bulk of the substance contained in the disk. I also charge the disk with different kinds of fluid vaporizing or changing in volume under different temperatures and other different conditions. In this manner I provide for the application of the trap more effectually than heretofore, and entirely automatically, no matter what condition arises.

Traps such as those to which my invention relates are subject to varying conditions, pressures and temperatures, and under these varying conditions it is desirable for effective operation to have a number of fluids that will operate independently. For example, the trap may be working under a partial vacuum, the pressure being thereby relieved to some extent from the outside of the disk in the presence of heat. A fluid in the disk of high volatility will then vaporize and cause a pressure expanding the walls and operating the valve. Again, let it be assumed that the same trap with the same disk is in service where the vacuum has been lost and it is subjected to atmospheric pressure. The interior pressure of the disk is then insufficient to withstand the atmospheric pressure and the walls are compressed and the valve opened until steam comes in contact with the disk, causing a second fluid to be vaporized, overcoming the atmospheric pressure, expanding the walls of the disk, and closing the valve. Again, there are certain conditions where a trap must discharge against slight back pressure. This back pressure has the same effect upon the disk of compressing it again to its normal state, even with the first two fluids fully vaporized. This third fluid, or fluids, must then be of a very low volatility, never vaporizing except on a back pressure when the temperature is higher than it could possibly be at atmosphere. After the vaporization of this last fluid it is found in practice that the trap will operate successfully when a back pressure of not more than twenty-five pounds surrounds the disk, thus meeting with the most severe conditions.

Having thus described the preferred form of my invention, what I claim as new and desire to secure by Letters Patent is:

1. An expansion disk for thermostatic controllers, said disk having sheet metal walls, of which the one has its edge lapped over the edges of the other, said walls being soldered together at their engaging inner surfaces, and the lapping edge of the first wall being soldered to the outer surface of the second wall.

2. In a thermostatic controller, a chambered expansion disk, and a brace located in the disk and extending across the interior thereof to engage the walls of the disk at various points along the length of the brace, whereby to prevent collapse of the disk.

3. In a thermostatic controller, a chambered expansion disk, and a plate in the disk set edgewise against its walls and forming a brace to resist the collapse of the disk.

4. In a thermostatic controller, an expansion disk, and a radially disposed brace within the disk to resist the collapse of the disk.

5. In a thermostatic controller, a chambered expansion disk, and radial braces within the disk to resist the collapse thereof, said braces being joined in pairs by reduced connecting portions and said reduced connecting portions lying against each other.

6. In a thermostatic controller, a chambered expansion disk with an interiorly projecting plug at approximately the center thereof, and radial braces joined in pairs by curved and reduced portions lying against each other and surrounding the inner portion of the plug.

7. In a thermostatic controller, a chambered expansion disk with interiorly projecting plugs in its sides, said plugs being juxtaposed to limit the contracting action of the disk, and radial projecting braces contained within the disk, also to limit the contracting action thereof.

8. In a thermostatic controller, a chambered expansion disk with interiorly projecting plugs in its sides, said plugs being juxtaposed to limit the contracting action of the disk, and radially projecting braces contained within the disk and also to limit the contracting action thereof, said braces being joined in pairs by reduced connecting portions lying against each other and embracing the inner portions of the plugs.

9. In a thermostatic controller, a casing, an expansion disk therein, said disk being provided with a part having a filling opening, a threaded pin adapted to close said opening, the pin screwing into the casing, and a combined stuffing box and lock nut screwing on the threaded pin and adapted to engage the casing.

10. In a thermostatic controller, a casing, an expansion disk, an orifice plug secured in the wall of the disk, a threaded rod screwed in the plug to close the orifice thereof, and a combined stuffing box and lock nut screwing on the rod and adapted to engage the casing.

11. In a thermostatic controller, a casing, an expansion disk therein, said disk being provided with a part having a filling opening, a threaded pin screwing into the casing and adapted to close said filling opening, a combined stuffing box and lock nut screwing on the pin and adapted to engage the casing, a thumb wheel, and means for removably connecting the same with the outer end of the pin.

In testimony whereof I have signed my name to this specification in the presence of two subscribing witnesses.

CLAYTON AUBRA DUNHAM.

Witnesses:
 E. A. FRANCIS,
 SAM ORMEROD.